(12) United States Patent
Abhishek

(10) Patent No.: US 10,601,523 B1
(45) Date of Patent: Mar. 24, 2020

(54) SYSTEM AND METHOD FOR COMMUNICATING DIGITAL DATA USING AMBIENT ACOUSTIC WAVES

(71) Applicant: NAFFA INNOVATIONS PRIVATE LIMITED, Bengaluru (IN)

(72) Inventor: Kumar Abhishek, Bengaluru (IN)

(73) Assignee: NAFFA INNOVATIONS PRIVATE LIMITED, Karnataka (IN)

( * ) Notice: Subject to any disclaimer, the term of this patent is extended or adjusted under 35 U.S.C. 154(b) by 0 days.

(21) Appl. No.: 16/379,768

(22) Filed: Apr. 9, 2019

(30) Foreign Application Priority Data

Dec. 19, 2018 (IN) .............................. 201841048160

(51) Int. Cl.
*H04B 11/00* (2006.01)
*H04B 14/00* (2006.01)
*H04B 14/04* (2006.01)

(52) U.S. Cl.
CPC ........... *H04B 11/00* (2013.01); *H04B 14/002* (2013.01); *H04B 14/04* (2013.01)

(58) Field of Classification Search
CPC ....... H04B 11/00; H04B 14/002; H04B 14/04
See application file for complete search history.

(56) References Cited

U.S. PATENT DOCUMENTS

| | | | |
|---|---|---|---|
| 8,514,662 B2 * | 8/2013 | Paulson | H04B 1/06 367/135 |
| 8,594,340 B2 * | 11/2013 | Takara | H04B 11/00 381/77 |
| 8,711,656 B1 * | 4/2014 | Paulson | H04B 7/2603 367/135 |
| 9,276,668 B2 * | 3/2016 | Paulson | H04B 7/2603 |
| 2012/0051187 A1 * | 3/2012 | Paulson | H04B 11/00 367/135 |
| 2013/0010979 A1 * | 1/2013 | Takara | G10L 19/093 381/77 |
| 2014/0134951 A1 * | 5/2014 | Paulson | H04B 7/2603 455/41.2 |
| 2014/0355386 A1 * | 12/2014 | Paulson | H04B 11/00 367/137 |
| 2016/0197648 A1 * | 7/2016 | Paulson | H04B 7/2603 455/41.1 |
| 2019/0028208 A1 * | 1/2019 | Abhishek | H04B 11/00 |

* cited by examiner

*Primary Examiner* — Daniel Pihulic
(74) *Attorney, Agent, or Firm* — Barry Choobin; Patent 360 LLC

(57) ABSTRACT

The embodiments herein disclose an apparatus and method developed for the direct application in data transmission between the user devices with computational power, without requiring an additional hardware or any other connectivity. The method comprises the following steps of receiving a digital data and a carrier signal as input; encoding the digital data into digital acoustic signal; transmitting the digital acoustic signal; capturing the acoustic signal by the microphone; demodulating the acoustic signal and decoding the digital sound data for recovering the original data.

7 Claims, 2 Drawing Sheets

SYSTEM AND METHOD FOR COMMUNICATING DIGITAL DATA USING AMBIENT ACOUSTIC WAVES

CROSS-REFERENCE TO RELATED APPLICATIONS

The embodiments herein claim the priority of the Indian Provisional Patent Application No. 201841048160 filed on Dec. 19, 2018 with the title "APPARATUS AND METHOD FOR COMMUNICATING DIGITAL DATA USING AMBIENT ACOUSTIC SIGNALS", and the contents of which is included entirely as reference herein.

BACKGROUND

Technical Field

The embodiments herein are generally related to wireless data communications. The embodiments herein are generally related to wireless digital data communications through sound waves. The embodiments herein are more particularly to wireless digital data communications using acoustic waves.

Description of Related Art

Widespread availability and popularity of mobile devices have made them indispensable in both business and everyday use. These mobile devices include portable computing devices such as laptops, netbooks and tablets that provide mobile computing power as well as access to the information on the Internet, text messaging, email and other functions. Other mobile devices such as wireless phone devices not only provide the portable computing functions but also include wireless voice capabilities along with applications using features such as built-in cameras, global positioning satellite (GPS) services and others.

In comparison, portable computers are not only used as general purpose computing devices but also operated more like a phone device for delivering phone calls and voice capabilities with protocols/services such as voice-over-IP (VOIP) and Skype™.

Despite these advances, the mobile devices still have difficulty in communicating with the desktop computers or workstations. The users of mobile phones attempting communication with a desktop computer have little choice but to send the user of the desktop computer a brief email or text message as well. Unfortunately, a manual entry of information required for sending emails or text messages is time consuming, prone to error and often dissuade the people from interacting altogether.

Indeed, the attempts to establish a direct communication between the mobile devices has been met with a failure for a variety of reasons. In many cases, very few devices have the specialized hardware required for communication. For example, the infrared transceivers are not found on all mobile devices or computers and therefore lack the scale required to permit a reliable communication. Moreover, the infrared communication is not only slow but requires a line-of-sight between the transceivers of the devices for operation.

Bluetooth communication is another interesting wireless protocol shared by many mobile devices, but it takes too long to sync or "pair" before completing any communication. The time delay for pairing not only frustrates the users but also makes the transmitted data more susceptible to interception. Accordingly, Bluetooth communication is seen as a security risk and not suited for transmitting sensitive information.

Another existing prior art approach for mobile communication involves displaying and reading bar codes from the display of a mobile device. The bar codes are generally displayed on a mobile device and then read by another device or computer having a camera or bar code scanner. However, a processing of bar codes in such a manner is difficult as each display device needs to be configured with different display parameters, aspect ratios, display resolutions and other factors to ensure that the bar codes are read reliably.

Yet another prior art approach discloses a placing of RFID tags on a mobile device to facilitate quick identification of the phone and promote mobile communication. Indeed, the RFID works quickly to identify the mobile device but requires each vendor to purchase a potentially expensive specialized reader device. Given the added expense of the reader and the complexity of accepting payments in this manner, RFID tags and readers have not been widely adopted.

All the above technologies have at least one drawback for an effective operation and efficient performance. Further the devices require the following parameters for their effective use. The parameters include a need for connectivity, removal of external interferences, solving of low transmission speed, effects due to extreme proximity and/or need for a special hardware, computational cost and/or problems concerning requisition of specialized hardware devices.

Therefore, there is need for a less complex, yet user-friendly, inexpensive and/or efficient way to share and/or transfer information. Hence there is a need for a system and method for effective and efficient digital data communication between nearby mobile devices through ambient acoustic waves. Further there is a need for a system and method for effective and efficient wireless digital data communication between nearby mobile devices without requiring a network connectivity or internet.

The abovementioned shortcomings, disadvantages and problems are addressed herein, which will be understood by reading and studying the following specification.

OBJECTIVES OF THE EMBODIMENTS HEREIN

The primary object of the embodiments herein are to effectively solve the above-mentioned issues of the technology of data communication between user devices, so that the need for connectivity to the Internet or networks for communication between devices is eliminated.

Another object of the embodiments herein are to provide a new communication method between two user devices using ambient noise, so that the signal is not affected by interferences.

Yet another object of the embodiments herein are to provide a communication method for providing two-way communication between two devices separated or operated at longer distances than those disclosed in the state of the art, such as up to about 10 to 15 centimeters away from each other.

Yet another objective of the embodiments herein are to provide a communication method between two devices using ambient noise, for providing communication in any device with computing power, audio output and microphone, thereby taking advantage of the great variety of appliances currently existing/available on the market.

These and other objects and advantages of the embodiments herein will become readily apparent from the following detailed description taken in conjunction with the accompanying drawings.

SUMMARY

The various embodiments herein provide an apparatus and method especially developed for a direct application in transmission involving user devices provided with some computational potential, thereby allowing data transmission between two devices without a need for an additional hardware or any other type of connectivity.

The embodiments herein provide a method and an apparatus to exchange data over the air using ambient acoustic waves. The data to be exchanged is received on a transmitter module and converted, as needed, to a digital representation suitable for digital signal processing. For example, binary data on the transmitter module is processed immediately while text or other symbolic data is converted into a digital representation for further processing. The transmitter module has at least one sound generator that transmits an acoustic carrier signal through the air. The digital representation of the data is modulated consistent with a modulation protocol using one or more acoustic transmission frequencies. The sound generator transmits the one or more acoustic carrier signals carrying the modulated data over the air. Each acoustic carrier signal has a sufficient gain to carry the signal to a receiver module where the data from the one or more acoustic carrier signals is demodulated to reconstruct the original data.

The method for the transmission of data between two devices according to the embodiments herein comprises the following steps of receiving a digital data and a carrier signal as input; encoding the digital data into acoustic waves; detecting each frequency gain of the input audio signal and thereby selecting a carrier frequency with a maximum gain value; phase modulating the selected carrier frequency based on gain and encoded data signal; broadcasting the acoustic waves; capturing the acoustic waves by the microphone; and demodulating and decoding the acoustic waves for recovering the digital data.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide an apparatus and method for communicating data between two devices without a need for an additional hardware or any other type of network connectivity.

The embodiments herein provide a method and an apparatus to exchange data over the air using ambient acoustic waves. The data to be exchanged is received on a transmitter module and converted, as needed, to a digital representation suitable for digital signal processing. For example, binary data on the transmitter module is processed immediately while text or other symbolic data is converted into a digital representation for further processing. The transmitter module has at least one sound generator that transmits an acoustic carrier signal through the air. The digital representation of the data is modulated consistent with a modulation protocol using one or more acoustic transmission frequencies. The sound generator transmits the one or more acoustic carrier signals carrying the modulated data over the air. Each acoustic carrier signal has a sufficient gain to carry the signal to a receiver module where the data from the one or more acoustic carrier signals is demodulated to reconstruct the original data.

The method for the transmission of data between two devices according to the embodiments herein comprises the following steps of receiving a digital data and a carrier signal as input; encoding the digital data into acoustic waves; detecting each frequency gain of the input audio signal and thereby selecting a carrier frequency with a maximum gain value; phase modulating the selected carrier frequency based on gain and encoded data signal; broadcasting the acoustic waves; capturing the acoustic waves by the microphone; and demodulating and decoding the acoustic waves for recovering the digital data.

Figure 1:
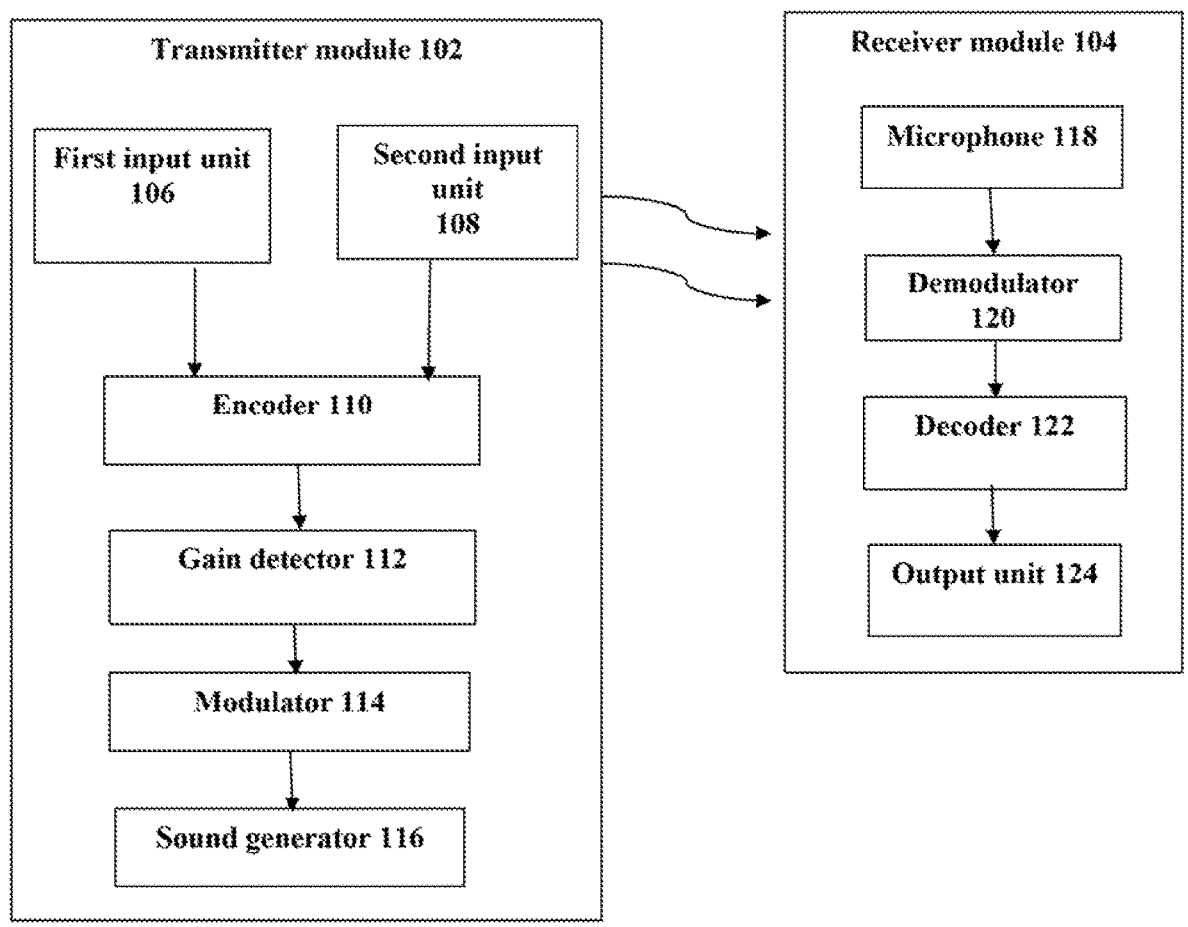
FIG. 1 illustrates a block diagram of an apparatus/system for communicating digital data using ambient acoustic waves, according to one embodiment herein.

FIG. 1 illustrates an apparatus for transmitting data among two user devices. The term "user device" refers to a portable computing device capable of receiving ambient noise and generating acoustic waves for embedding the digital data to be transmitted. Examples of the user device include but is not be limited to, a cell phone, a personal digital assistant (PDA), a wireless email terminal, and a portable point of sale device, a laptop and a tablet computer.

As shown in the FIG. 1, a data is transferred from a first user device of one user to a second user device of another user. Examples of data can include but are not limited to images, audio clips, videos, text messages, documents, files, etc.

The user device includes a transceiver comprising a transmitter module 102 and a receiver module 104, a first input unit 106 and a second input unit 108, an encoder 110, a gain detector 112, a modulator 114, a speaker/sound generator 116, a microphone 118, a demodulator 120, a decoder 122, a storage module (not shown), and an output unit 124. The transceiver 102 and 104 is configured to send and receive electronic signals wirelessly using radio frequencies. The input unit 106 and 108 includes a microphone 118 configured for receiving acoustic input and converting the acoustic input into one or more audio signals. According to an embodiment herein, the microphone 118 is configured to receive acoustic signals having frequencies between 20 hertz and 22,000 hertz. According to an embodiment herein, the input unit 106 and 108 includes other input means such as touch pads, keypads, etc., for interacting with the user.

As disclosed herein, the term "audio/acoustic signal" refers to sound wave frequencies lying within the audible spectrum, which is approximately 20 Hz to 20 kHz.

At the transmitting module, digital data is encoded into acoustic signals carried on by sound waves having a certain frequency or range of frequencies. At a receiver module 104, the sound waves are received and decoded back into digital data.

The transmitter module 102 comprises a first input unit 106 configured to receive ambient noise signal received through microphone 118 as carrier input, a second input unit 108 configured for receiving digital human readable data as data input, an encoder 110 configured for converting the digital data into machine readable signal, a gain detector 112 configured for detecting each frequency gains of the input audio signal and thereby selecting a carrier frequency with a maximum gain value, a modulator 114 coupled to the encoder 110, the modulator 114 configured for phase modulating the selected carrier frequency based on gain and encoded data signal, and a sound generator 116 such as a speaker 116 configured to broadcast the carrier frequency embedded in the form of sound/acoustic waves.

The encoder 110 receives and encodes digital data to generate code symbols. The encoding includes error correction coding and/or error detection coding to increase the reliability of the acoustic channel. Such encoding may include, but is not limited to, interleaving, convolutional coding, and cyclic redundancy check (CRC) coding. Addition of CRC bits is a known technique to allow error detection.

The encoder 110 is configured to look for the max gain frequencies in the environment (audio data received through microphone 118). These frequencies are chosen as the carrier frequencies for the data transmission by the algorithm. Algorithm applies PSK modulation to these frequencies which will help to reproduce same frequencies available in current environment with their respective gain value. Hence the modulation doesn't affect to the human ear.

The modulator 114 is configured to modulate the code symbols into multiple sound wave carriers.

According to an embodiment herein, the modulator 114 comprise a digital modulator 114, an inverse Fast Fourier Transform (IFFT) element and an up-converter for modulation of the code symbols into multiple sound wave carrier signals. Digital modulator 114 is a quadrature phase shift keying (QPSK) modulator 114. However, a digital modulation technique other than QPSK, for example, amplitude shift keying (ASK), frequency shift keying (FSK), phase shift keying (PSK) or a combination thereof, is implemented in the modulator 114.

Accordingly, digital data is modulated into multiple sound wave carrier signals for transmission and emitted as sound waves through sound generator 116. A second user device within (a sound receivable range) the distance over which sound is heard, detected or sensed is configured to receive and process the transmission through sound processor and demodulator 120 for display, storage and/or presentation. Due to the nature of the acoustic channel, the amount of interference is increased, when the distance between two communicating devices is increased.

The apparatus further comprises storage means (not shown) for storing data to be transmitted. Storage means (not shown) are well known in the art and hence shall not be described in detail.

The receiver module 104 comprises a microphone 118 for receiving modulated acoustic signals transmitted by the transmitter module 102, a demodulator 120 coupled to the microphone 118, the demodulator 120 configured for demodulating the carrier frequency for reconstructing the encoded signal, a decoder 122 coupled to the demodulator 120, the decoder 122 configured for decoding the encoded logical signal into digital data and an output unit 124 coupled to the decoder 122, the output unit 124 configured for displaying the digital data in a human readable and/or comprehendible form.

The demodulation unit coupled to the microphone 118 comprises a demodulator 120 that is configured to demodulate and recover digital data from the acoustic signals by filtering out the carrier signals, and a decoder 122 to decode the demodulated data for output to a user. According to one embodiment of the embodiments herein, decoder 122 comprises a Viterbi decoder 122. Thus, the demodulated data is decoded using well known implementations of the Viterbi algorithm. The decoded digital data is displayed or stored for later use.

The decoder 122 is also configured to search or look for the frequencies available with a maximum gain (audio signals received through microphone 118). The decoder is further configured to find data which is encoded in the ambient noise signal and by using PSK demodulation.

The encoder 110 and the decoder 122 are not configured to use any specific predefined (preset) frequency sets, they use the frequencies available with highest gain in the current environment. The encoder 110 and the decoder 122 do not require any specific predefined (preset) frequency sets for data transmission. So, the data is transmitted with little effort and the noise in the environment is almost zero.

The recovered digital data is output to a user through a display and/or other output devices 124 for presentation or stored for later presentation or use. The digital data includes but not limited to, personal information; contact information such as names, phone numbers, and addresses; business information; calendar information; memos; software or a combination thereof. The apparatus 100 also comprises a processor (not shown) such as a central processor (CPU) or digital signal processor (DSP) to control a transmission and reception of data using sound waves. It would be apparent to those skilled in the art that the placement of the processor is not important and that the placements of elements may also be rearranged without affecting the performance and/or purpose of apparatus 100.

Figure 2:
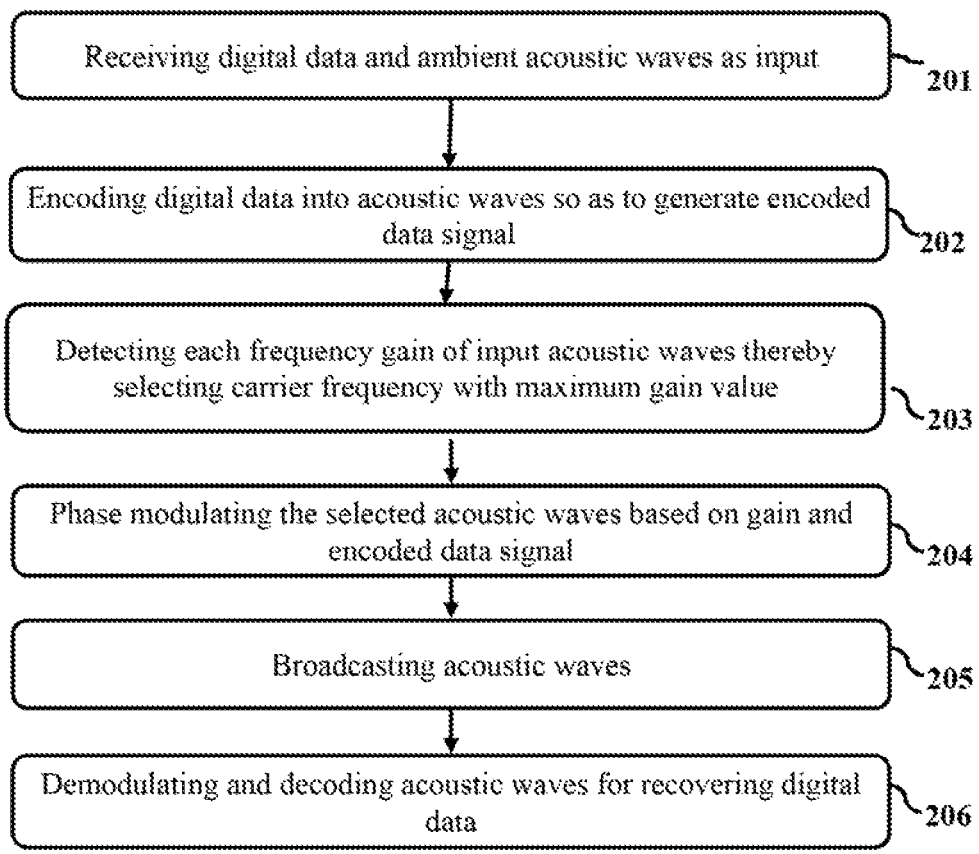
FIG. 2 illustrates a flow chart explaining a method for communicating digital data using ambient acoustic waves, according to one embodiment herein.

As illustrated in FIG. 2, the method for the transmission of data between two devices, according to one embodiment of the embodiments herein comprises the following steps: receiving digital data and ambient acoustic waves as input (201); encoding digital data into acoustic waves to generate encoded data signal (at step 202), detecting each frequency gain of input acoustic waves thereby selecting carrier frequency with maximum gain value (at step 203), Phase modulating the selected acoustic waves based on gain and encoded data signal (at step 204), broadcasting acoustic waves (at step 205) and Demodulating and decoding acoustic waves for recovering digital data (at step 206). The digital data thus recovered is displayed using the output device such as display unit of the user device.

Accordingly, the users are enabled to perform a one way or bidirectional communication easily and conveniently as described above. By using a multi-carrier system, data is transmitted in a robust manner using sound waves. Furthermore, a standard speaker and/or microphone is used to implement the invention. Therefore, the invention is easily implemented in existing devices since most computers have either built-in speakers and microphones or add-in sound cards, modules, devices or interfaces.

In addition, the embodiments herein may be implemented by hardware, software, firmware, middleware, microcode, or any combination thereof. When implemented in software, firmware, middleware or microcode, the program code or code segments to perform the necessary tasks may be stored in a machine-readable medium such as storage medium or in a separate storage(s) not shown. A processor is configured to perform the necessary tasks. A code segment represents a procedure, a function, a subprogram, a program, a routine, a subroutine, a module, a software package, a class, or any combination of instructions, data structures, or program statements. A code segment is coupled to another code segment or a hardware circuit by passing and/or receiving information, data, arguments, parameters, or memory contents. Information, arguments, parameters, data, etc., are passed, forwarded, or transmitted via any suitable means including memory sharing, message passing, token passing, network transmission, etc.

Although the embodiments herein are described with various specific embodiments, it will be obvious for a person skilled in the art to practice the embodiments herein with modifications.

The embodiments herein provide one or more of the following advantages. Use of acoustic communication of the embodiments herein scales quickly as it is compatible across a wide range of computers and user devices. Sound components and other supporting hardware necessary to perform acoustic communication in accordance with the embodiments herein are generally available and already installed on most of these devices. For example, many computers and user devices already include CODECS, filters, digital signal processors (DSP), memory and other components necessary for processing sound. These sound components are built directly into the computer or user device or added afterwards using an after-market sound card or an externally connected peripheral sound device.

Method and apparatus designed in accordance with the embodiments herein take advantage of these sound components to modulate data on an acoustic carrier signal. The acoustic carrier signal is processed by user devices and computers from different manufacturers provided the sound components on each device operate at a sufficient sample rate and frequency response. This makes it possible for various devices to communicate together over a wide range of carrier frequencies while running on dissimilar hardware platforms and otherwise incompatible operating systems. For example, a wireless device running the Android operating system can readily communicate sonically with a computer device running Microsoft Windows, the Apple OS X operating system or an Apple iPhone or iPad (Windows is a registered trademark of Microsoft Corporation of Redmond, Wash., Android is a registered trademark of Google, Inc. of Mountain View Calif., iPhone and iPad are registered trademarks of Apple, Inc. of Cupertino, Calif.).

Acoustic communication implemented in accordance with the embodiments herein has considerable economic advantages. As previously described, most of the hardware required for acoustic communication is already installed on the computers and user devices of interest. Software designed in accordance with the embodiments herein are installed on most devices without requiring additional hardware or even a hardware upgrade. In some cases, there is a nominal cost associated with attaching a microphone 118 or speaker 116 to the sound components already installed on the device. Even if the sound components are not already installed on these devices, there are many after market manufacturers of sound components and sound cards that are combined with or added to existing hardware at a relatively low-cost. In some cases, it is even be cost-effective to create custom or semi-custom sound card designs using codecs and processors available from companies such as Texas Instruments.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for data transmission between two user devices without network connectivity, the system comprising:
   a transmission module configured for transmitting acoustic waves embedded with a digital data, and wherein the transmission module comprises:
   a first input unit configured to receive ambient acoustic waves;
   a second input unit configured for receiving digital human readable data as data input;
   a coding module configured for generating encoded data signal, and wherein the coding module comprises a gain detector configured for detecting each frequency gain of the input acoustic waves for selecting a carrier frequency with a maximum gain value; and
   a sound generator configured to broadcast a carrier frequency embedded in a form of acoustic waves; and
   a receiver module configured for receiving transmitted acoustic waves, and wherein the receiver module comprises:
   a microphone for receiving modulated acoustic signals transmitted by the transmitter module;
   a demodulation unit coupled to the microphone, and wherein the demodulation unit is configured for reconstructing the digital data, and wherein the demodulation unit comprises a decoder coupled to the demodulator, and wherein the decoder is configured to decode the demodulated data for output to a user.

2. The system as claimed in claim 1, wherein the coding module comprises an encoder configured for converting the digital data into machine readable signal.

3. The system as claimed in claim 1, wherein the coding module comprises a modulator coupled to the encoder, and wherein the modulator is configured for phase modulating the selected carrier frequency based on gain and encoded data signal.

4. The system as claimed in claim 1, wherein the demodulation unit coupled to the microphone comprises a demodulator, and wherein the demodulator is configured to demodulate and recover digital data from the acoustic signals by filtering out the carrier signals.

5. The system as claimed in claim 1, wherein the receiver module further comprises an output unit coupled to the decoder for displaying the digital data.

6. The system as claimed in claim 1 further comprises a processor configured to control a transmission and reception of data using acoustic waves.

7. A method for transmission of data between two user devices without network connectivity, the method comprising steps of:
- receiving a digital data and ambient acoustic waves as input;
- encoding the digital data into acoustic waves to generate an encoded data signal;
- detecting each frequency gain of the input acoustic waves for selecting a carrier frequency with a maximum gain value;
- phase modulating the selected acoustic waves based on gain and encoded data signal;
- broadcasting the acoustic waves;
- capturing the acoustic waves by the microphone;
- demodulating and decoding the acoustic waves for recovering the digital data; and
- displaying the digital data.

* * * * *